United States Patent
De Vries

(10) Patent No.: US 8,047,052 B2
(45) Date of Patent: Nov. 1, 2011

(54) AUTOMATIC DETERMINATION OF AN EMISSION VALUE FOR A MOTOR VEHICLE

(75) Inventor: Dominic De Vries, Tubingen (DE)

(73) Assignee: Arktik GmbH, Hamburg (DE)

( * ) Notice: Subject to any disclaimer, the term of this patent is extended or adjusted under 35 U.S.C. 154(b) by 175 days.

(21) Appl. No.: 12/510,489

(22) Filed: Jul. 28, 2009

(65) Prior Publication Data

US 2010/0024521 A1  Feb. 4, 2010

(30) Foreign Application Priority Data

Jul. 31, 2008 (EP) .................................... 08161582

(51) Int. Cl.
*G01N 7/00* (2006.01)
(52) U.S. Cl. .................................... 73/23.31; 73/114.69
(58) Field of Classification Search .................. 73/23.31, 73/114.69, 114.71
See application file for complete search history.

(56) References Cited

U.S. PATENT DOCUMENTS

| | | | | |
|---|---|---|---|---|
| 4,934,419 A * | 6/1990 | Lamont et al. | ...................... | 141/94 |
| 5,105,651 A * | 4/1992 | Gutmann | ...................... | 73/23.31 |
| 5,343,906 A * | 9/1994 | Tibbals, III | ...................... | 141/83 |
| 6,216,527 B1 * | 4/2001 | Beecham et al. | ............ | 73/23.31 |
| 6,234,390 B1 * | 5/2001 | Rabe | .............................. | 235/384 |
| 6,988,033 B1 * | 1/2006 | Lowrey et al. | ................. | 701/123 |
| 7,580,808 B2 * | 8/2009 | Bos | .............................. | 702/127 |
| 7,640,185 B1 * | 12/2009 | Giordano et al. | ................ | 705/23 |
| 2003/0110075 A1 * | 6/2003 | Shioda et al. | .................... | 705/13 |
| 2004/0093264 A1 * | 5/2004 | Shimizu | ........................ | 705/13 |
| 2008/0154671 A1 * | 6/2008 | Delk | .................................. | 705/7 |
| 2010/0161391 A1 * | 6/2010 | Ashby et al. | .................... | 705/13 |
| 2010/0217535 A1 * | 8/2010 | Seidel | ............................. | 702/24 |

* cited by examiner

*Primary Examiner* — Freddie Kirkland, III
(74) *Attorney, Agent, or Firm* — Kauth, Pomeroy, Peck & Bailey LLP

(57) ABSTRACT

The invention concerns the automatic determination of an emission value for a motor vehicle. For this purpose, a system for the automatic determination of an emission value for a motor vehicle 4 is described that comprises the following: a fuel quantity sensor 1, an identification device 3 for registering an account identification, an account database 7 containing at least one account information item for each of a multitude of accounts 8, and a determination device 6, where: the fuel quantity sensor 1 determines a fuel quantity added to the tank and transmits it to the determination device 6; an account identification registered by the identification device 3 is transmitted to the determination device 6 and is associated with the fuel quantity added to the tank; and where the determination device 6 determines the emission value on the basis of the fuel quantity added to the tank and at least one account information item of the account 8 associated with the account identification. This permits a simple and reliable determination of the emission value that also meets with a high degree of acceptance by the users.

15 Claims, 4 Drawing Sheets

AUTOMATIC DETERMINATION OF AN EMISSION VALUE FOR A MOTOR VEHICLE

FIELD OF THE INVENTION

The invention concerns a process for the automatic determination of an emission value for a motor vehicle as well as an associated system.

BACKGROUND OF THE INVENTION

In the past few decades, a slow rise in the average temperature of the atmosphere in close proximity to the earth has been observed, a phenomenon that is commonly called global warming. At the present time, it is assumed that the so-called greenhouse effect is a significant cause of global warming. This effect is intensified by the combustion of fossil fuels and other human interventions in the environment, such as deforestation, since this increases the concentration of carbon dioxide ($CO_2$) in the atmosphere.

The contribution of individuals to global warming is determined, among other things, by the operation of motor vehicles that consume fossil fuels like gasoline or diesel fuel. It is known from the state of the art that possibilities exist for persons to pay fees that are intended to compensate for their activities that increase global warming. In this context, for example, opportunities are provided to compensate for the emissions caused by a person's vehicle by means of equivalent compensation payments. For example, this is currently done by voluntarily paying an additional lump sum per liter of fuel when fueling a motor vehicle. In addition, as regards voluntary $CO_2$ compensation, so-called "$CO_2$ calculators" are known that can be used to calculate the annual emission of $CO_2$ on the basis of the total kilometers driven per year. The compensation payments help to fund such projects that are intended to counteract the rise of $CO_2$ in the atmosphere. On this basis, a voluntary fee for compensating for the $CO_2$ emissions is determined that the person is question can then transfer, for example via a broker, to an appropriate project. Such projects include reforestation projects, or the construction of windmill parks or of solar power plants that emit reduced quantities of $CO_2$ when generating electric power.

However, these existing procedures known from the state of the art for $CO_2$ compensation by individual persons are not satisfactory. The existing procedures are imprecise and not source-specific in determining the quantity of the emissions, i.e., they do not take into account characteristics that are typical for a driver or a vehicle (for example, they only take into account the kilometers driven). Furthermore, these procedures are costly. They require the active updating of the determination factors necessary for calculating the compensation, and the performance of an individual compensation process for each procedure. Even for dedicated and environmentally concerned persons, these inaccuracies and their costly use are reasons that discourage an adequate use of such procedures.

SUMMARY OF THE INVENTION

As a consequence, the invention addresses the problem of proposing such a process as well as such a system for the automatic determination of an emission value for a motor vehicle that would make an uncomplicated and precise emission calculation possible.

According to the invention, this problem is solved by a process for the automatic determination of the emission value of a motor vehicle, with the following steps:

Determination of the quantity of fuel that has been put into the tank and/or has been consumed, Determination of an account identification, Association of the determined account identification with the determined quantity of fuel, Determination of at least one account information of an account associated with the account identification, and Determination of an emission value based on the quantity of fuel that was put into the tank and at least the determined account information of the account associated with the account identification.

According to the invention, this means that an account-specific emission value is determined on the basis of the quantity of fuel that was put into the tank and the account-specific information for this account. Preferably, the emission value that is determined represents an emission quantity and/or an emission fee specifically as regards the emitted carbon dioxide ($CO_2$). In contrast to the processes known from the state of the art, this makes it possible to determine with high precision—i.e. on the basis of the emissions that are typical for a driver or a vehicle—an associated emission value that represents, for example, the quantity of the emitted emissions or a compensation fee directly, either individually for a user, a family, or a company, or for a specific vehicle or for a fleet of vehicles. The process according to the invention therefore offers a needs-specific possibility for eliminating weaknesses in the conventional compensation process.

In principle, provisions may be made that the emission value, i.e., for example the emission quantity and/or the emission fee is only determined and then passed on or processed further as needed, i.e., is passed on regularly, for example, as information in the form of an "account statement". According to a preferred implementation of the invention, however, a calculated emission fee is automatically debited to a money account. In this context, an especially preferred version provides for the calculated emission fee to be debited in conjunction with the payment for the fuel. This is especially advantageous in that this makes it possible to establish an individual emission fee for the operation of a motor vehicle, which simplifies the process in comparison with existing procedures, i.e. additional activities are not required of the user for the compensation of emissions.

According to a preferred implementation of the invention, provisions are also made for attributing the determined emission value to the account associated with the account identification and for preferably storing it there. On the one hand, this may serve as a basis for additional payment processes, but it may also serve to generate an overview over the emission values to be attributed to an account, for an individual person, an individual vehicle, or a multitude of persons and/or vehicles.

In principle, provisions may be made for a single item of account information, but provisions for a multitude of account information items may also be made. According to a preferred implementation of the invention, the account information comprises an account-specific emission key, an account-specific compensation key, and/or an account-specific type of compensation. This means that in the case of an account-specific emission quantity key, an emission quantity per quantity of fuel that is put into the tank or is consumed is stored for the account in question. Preferably, this emission quantity is pre-set and is dependent, for example, on the type of motor vehicle and/or the type of fuel used by the motor vehicle. In the case of an account-specific compensation key, for example, the rate of the emission compensation is pre-set. For example, the user of this system is able to decide to compensate a certain percentage of the determined emissions, for example 25, 50, 100, or 150%. Finally, in addition or as an alternative, an account-specific type of compensation may be selected that, for example, specifies the type of project to be funded by the emission fee. This may be a specific project. However, it may also be sufficient to simply specify a certain type of project, for example "reforestation," "wind mill park," etc.

In principle, the invention can be realized simply by determining the quantity of the fuel that is put into the tank or consumed, and by taking this into account for the determination of the emission value. However, according to a preferred implementation of the invention, the type of fuel put into the tank is also determined and taken into account for the determination of the emission value. This is of interest especially when a motor vehicle is capable of using several types of fuel, such as regular gasoline, premium, or premium plus, each of which is associated with a different quantity of emissions per quantity of fuel that is put into the tank or consumed.

In principle, it is possible to perform the account identification in different ways. For example, the user of the process can identify him/herself via a PIN code by means of a keyboard. However, according to a preferred implementation of the invention, the account identification is provided on an identification element. In this context, special preference is given to an identification element that, besides the account identification, contains at least one item of account information. This makes it possible to use for the process, instead of a central account database, a database that exists in a "distributed" form, i.e. on a multitude of identification elements that are in circulation. It is also possible, of course, for part of the account information items to be stored on the identification elements while another part is stored in a central database, for example in a database server. By the same token, it is also possible, of course, to provide account information in redundant form, i.e. on the identification element as well as in a central database. Different possibilities also exist for the identification element. According to a preferred implementation of the invention, the identification element comprises a machine-readable card with a magnetic strip or an integrated electronic chip (e.g. an RFID chip).

In this context it should be noted that despite the use of an identification element, additional manual input may be provided, i.e. the manual entry of data regarding the individual fueling process. It is possible, for example, to specify individually for a fueling process or a consumption process for which vehicle of a multitude of pre-determined vehicles of a user the emission value is to be determined, and/or what type of compensation project is desired in the concrete case, and/or which compensation key is to apply to the current fueling process or consumption process, i.e. what percentage of the emissions is to be compensated.

According to a preferred implementation of the invention, the fuel consumption is determined in the vehicle, and the determined fuel consumption is taken into account for the determination of the emission value. The fuel consumption may be measured in the fuel tank and/or by means of the exhaust gases. In principle, it is possible to use the fuel consumption directly, i.e. in real time, for the determination of the emission value. However, according to a preferred implementation of the invention, the fuel consumption data is stored in a storage device provided in the vehicle. As an alternative, when the fuel consumption data is transmitted continuously to an external unit, the fuel consumption data may also be stored in the external unit. When a storage device in the vehicle is used, special preference is given to a feature where the fuel consumption data is transmitted from the storage device to an external determination device. This transmission may be performed in several different ways. However, in this context, special preference is given to a wireless transmission of the fuel consumption data to the determination device.

According to the invention, the problem referred to above is also solved by means of a system for the automatic determination of an emission value for a motor vehicle, comprising:
 a fuel quantity sensor,
 an identification device for registering an account identification,
 an account database containing at least one account information for each of a multitude of accounts,
 a determination device where:
 the fuel quantity is determined by the fuel quantity sensor and is transferred to the determination device,
 an account identification registered by the identification device is transferred to the determination device and is associated with the determined quantity of fuel, and
 the determination device determines the emission value on the basis of the determined quantity of fuel and at least one account information of the account associated with the account identification.

According to the invention, this is, therefore, a system with different components that, on the one hand, permit the determination of the quantity of fuel that was put into the tank or was consumed, for example directly at the location where the fueling took place (for example the gas pump), and that also make it possible to associate, via an account identification registered by an identification device, the determined quantity of fuel with an account, with the actual determination of the emission value being ultimately performed in the determination device to which the necessary data is transmitted and which has access to the account database that contains the account information necessary for determining the emission value. As described above, this account database may consist of a central database; however, the account database may also be formed by the account information items that exist on a multitude of identification elements that are in circulation, for example cards with magnetic strips.

Preferred implementations of the system according to the invention are those that are analogous to the preferred implementations of the process according to the invention that are described above. Specifically, the following applies:

According to a preferred implementation of the system according to the invention, the determined emission value comprises an emission quantity and/or an emission fee. In addition, it is preferred that the determined emission fee is automatically debited to a money account. In this context, an especially preferred feature provides for the determined emission fee to be paid in conjunction with the fuel payment.

According to a preferred implementation of the invention, the determined emission value is added to the account associated with the account identification and is preferably recorded there.

It is also preferred that the account information comprises an account-specific emission quantity key, an account-specific compensation key, and/or an account-specific type of compensation. As described in detail above, this makes it possible to determine what quantity of emissions is assumed per quantity of fuel added to the tank, what the percentage of the compensation (e.g. 25, 50, 100, 150%) for the subsequent emissions is to be, and/or which type of project the determined emission fee is to fund.

According to a preferred implementation of the invention, a fuel type sensor for identifying the fuel type is provided that determines the fuel type and transmits this information to the determination device. In this context, it is also preferred that the fuel type is taken into account for the determination of the emission value.

According to a preferred implementation of the invention, the account identification is provided on an identification element, preferably a machine-readable chip or magnetic card (e.g. a RFID chip). It is also preferred that, besides the account identification, the identification element contain at least one account information item. As described above, this makes it possible to establish a "distributed" database in the form of a multitude of identification elements that are in circulation that, besides the account identification, contains at least one account information item, such as an account-specific emission quantity key and/or an account-specific compensation key and/or an account-specific type of compensation.

In addition, according to a preferred implementation of the invention, a consumption sensor is provided in the vehicle that determines the fuel consumption and feeds the fuel consumption data into the determination device where the data is taken into account for the determination of the emission value. Preferably, the fuel consumption is determined in the tank and/or by means of the exhaust gases.

In this context, the fuel consumption data is preferably stored in a storage device provided in the vehicle. In addition, the fuel consumption data is preferably transmitted to the determination device, with special preference for a wireless transmission.

BRIEF DESCRIPTION OF THE DRAWINGS

Below, the invention is explained in detail with reference to the drawing.

DETAILED DESCRIPTION OF THE INVENTION

Figure 1:
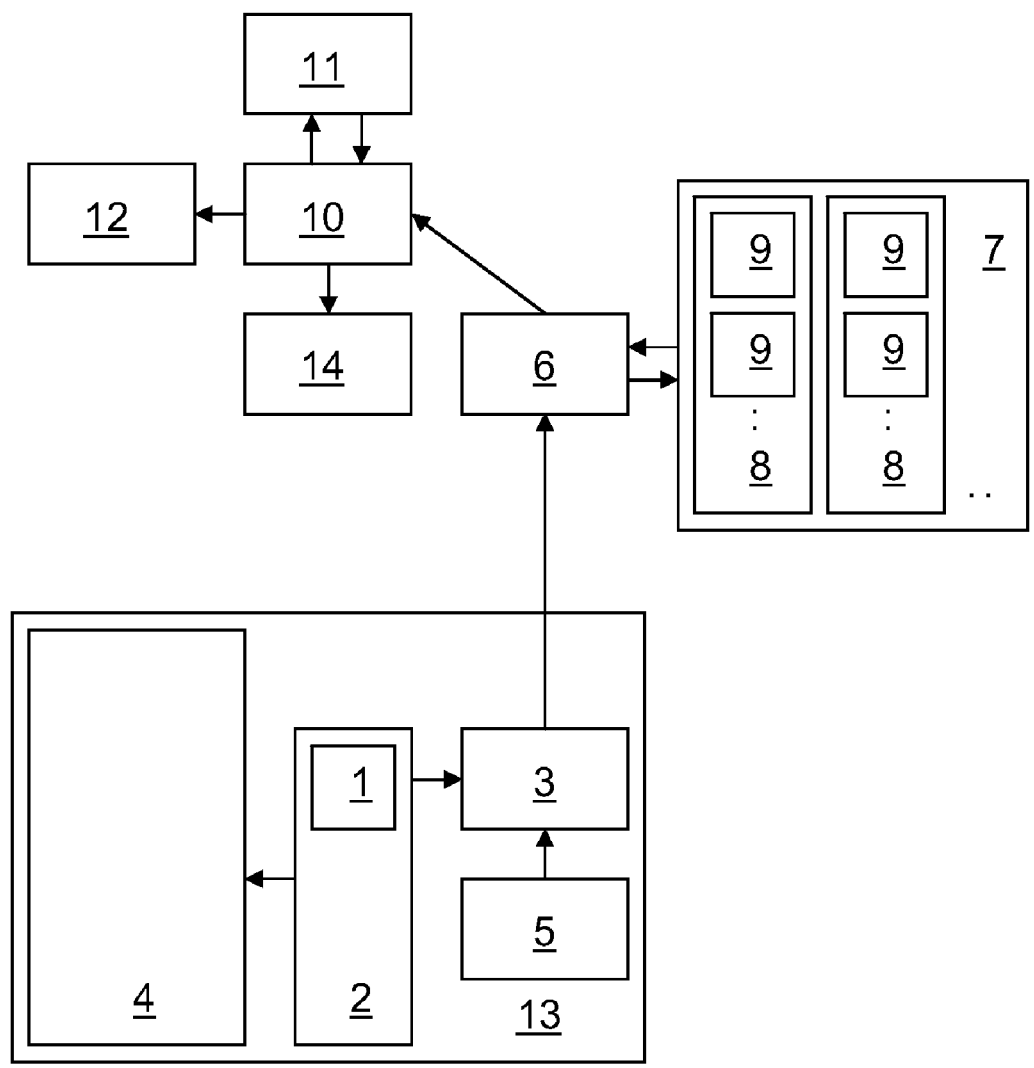
FIG. 1 shows schematically a system for the automatic determination of an emission value for a motor vehicle according to a preferred embodiment of the invention.

FIG. 1 shows a system for the automatic determination of an emission value for a motor vehicle according to a first preferred embodiment of the invention. This system comprises a fuel quantity sensor 1 that is part of the pump 2 of a gas station 13 and also serves to determine the quantity of fuel added to the tank and the payment of the same. According to the preferred embodiment of the invention described here, the system also includes an identification device 3 for determining an account identification.

When fueling a vehicle 4 by means of the gas pump 2, the dispensed fuel quantity is determined by means of the fuel quantity sensor 1 and is transmitted to the identification device 3. Also, by means of the identification device 3, an identification element 5—in this case a card with a magnetic strip—is read with respect to the account identification it contains. For this purpose, the user of the system carries this card with him/her when fueling the vehicle and submits it at the gas station for payment of the fuel so that the information it contains can be read.

The account identification and the purchased fuel quantity are associated with each other and transmitted to a determination device 6. As can be seen in FIG. 1, according to the preferred embodiment described here, the determination device 6 is located remotely from the gas station 13, as a central determination device 6 for a multitude of gas stations 13, preferably for all gas stations 13 of at least one gas station operator. This offers the user the opportunity to ensure that, when fueling his/her motor vehicle 4 at a facility of this operator, he/she can always use the system in question for automatic emission fees.

The determination device 6 has access to an account database 7 that contains a multitude of accounts 8 with account information items 9 contained in each. On the basis of the account identification determined by the identification device 3, the determination device 6 is able to determine the associated account 8 in the account database that contains the account information 9 for the fueled motor vehicle 4. Available are account information items associated with the user of the motor vehicle 4, a account-specific emission quantity key, i.e. the information regarding the specific emissions generated by the vehicle 4 for a certain quantity of fuel added to the tank, an account-specific compensation key, i.e. the information on what portion of the emission value to be determined later is to be compensated, and finally an account-specific type of compensation that indicates the type of project that is to benefit from the emission fee that is to be determined.

In order to determine the emission fee, first a monetary emission fee is determined based on the fuel quantity added to the tank and on the account-specific emission quantity key as emission value. This monetary emission fee is transmitted as payment information to a payment system 10 that collects the emission fee from the money account 111 associated with the account identification and transfers it to a compensation account 12 where the payment is used for a compensation project. According to the preferred embodiment of the invention described here, the payment system 10 also serves to collect the payment for the purchased fuel quantity, for which it also uses the money account 11; this payment is transferred to a gas station account 14 that is associated with the gas station 13 that operates the gas pump 2.

As a result, a system is made available that not only permits easy payment for a purchased quantity of fuel by means of a card, but, at the same time, also leads to an individual emission fee through the use of an appropriate credit or fuel company card as identification element 5.

Figure 2:
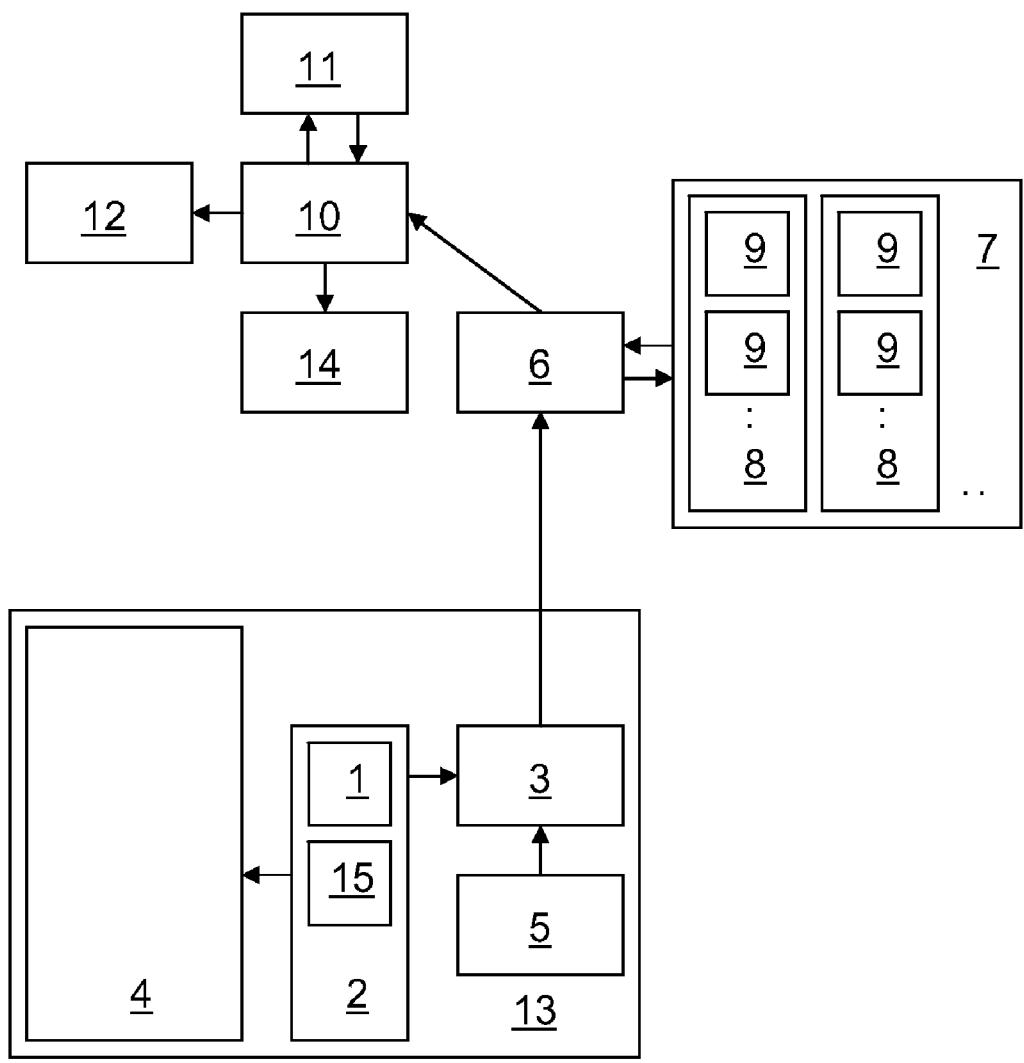
FIG. 2 shows schematically a system for the automatic determination of an emission value for a motor vehicle according to a second preferred embodiment of the invention.

FIG. 2 shows schematically a system for the automatic determination of an emission value for a motor vehicle according to a second preferred embodiment of the invention. This system corresponds essentially to the system shown in FIG. 1, but also adds a fuel type sensor 15 in the gas pump. This sensor 15 determines the type of fuel purchased, e.g. regular, premium, or premium plus gasoline, so that the specific emissions associated with the type of fuel purchased can be taken into account for the calculation of the emission value, specifically of the emission fee.

Figure 3:
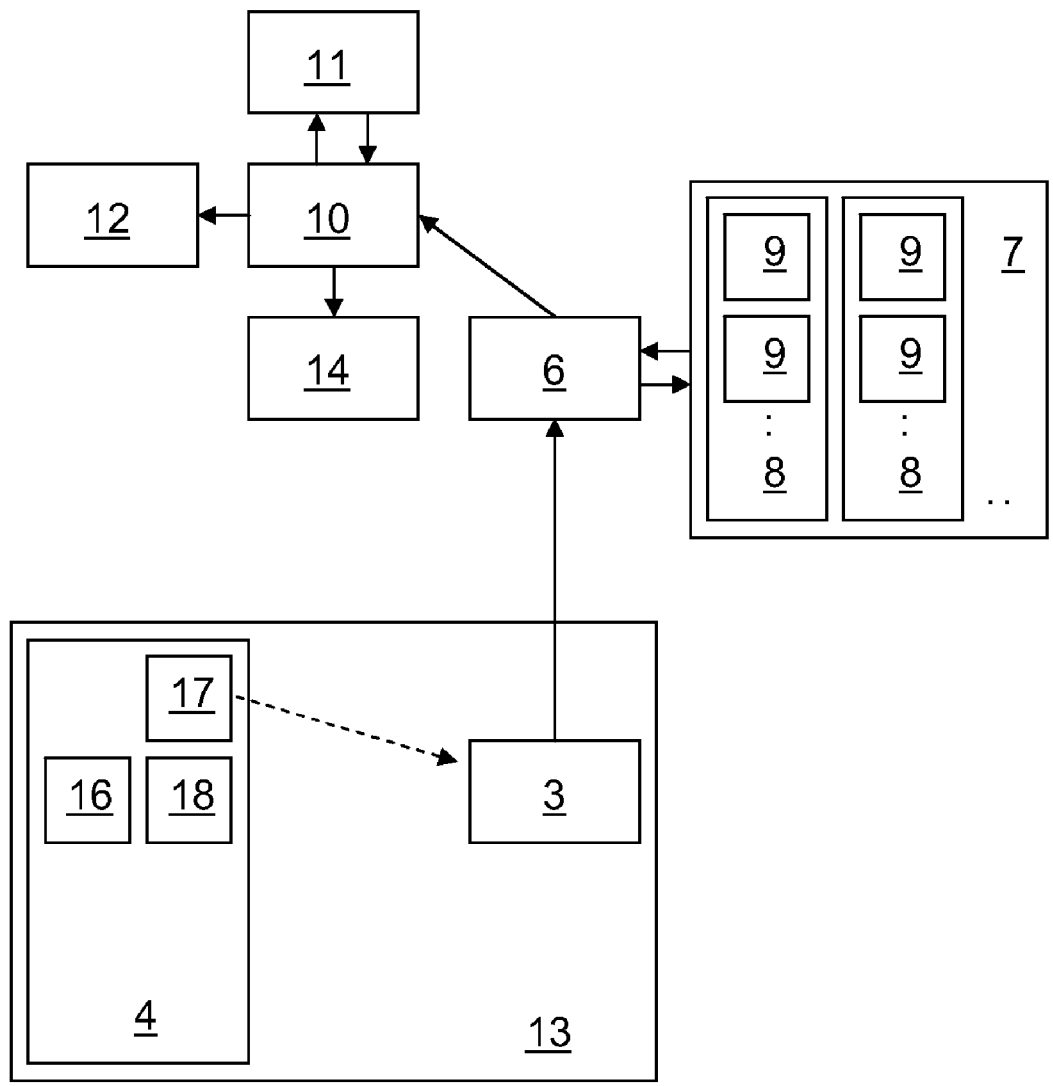
FIG. 3 shows schematically a system for the automatic determination of an emission value for a motor vehicle according to a third preferred embodiment of the invention.

FIG. 3 shows schematically a system for the automatic determination of an emission value for a motor vehicle according to a third preferred embodiment of the invention. Here, a consumption sensor 16 is provided in the vehicle 4 that determines the fuel consumption in the tank itself. The fuel consumption data determined in this manner is transferred to the determination device 6 and taken into account there during the determination of the emission value. This is accomplished by storing the fuel consumption data in a storage device 17 provided in the vehicle. In this case, the storage device 17—implemented in the form of a card—is removable and may also serve as an identification element. This means that the card serving as an identification element as well as a storage device 17 is inserted into an associated interface in the vehicle 4 when said vehicle is being operated, and serves to store the fuel consumption data. When paying for the purchased fuel after the fueling process at the gas station 13, the identification device 3 determines the fuel consumption by means of the storage device 17 and transfers the data to the determination device 6, where the fuel consumption data is then used to determine the emission fee.

Figure 4:
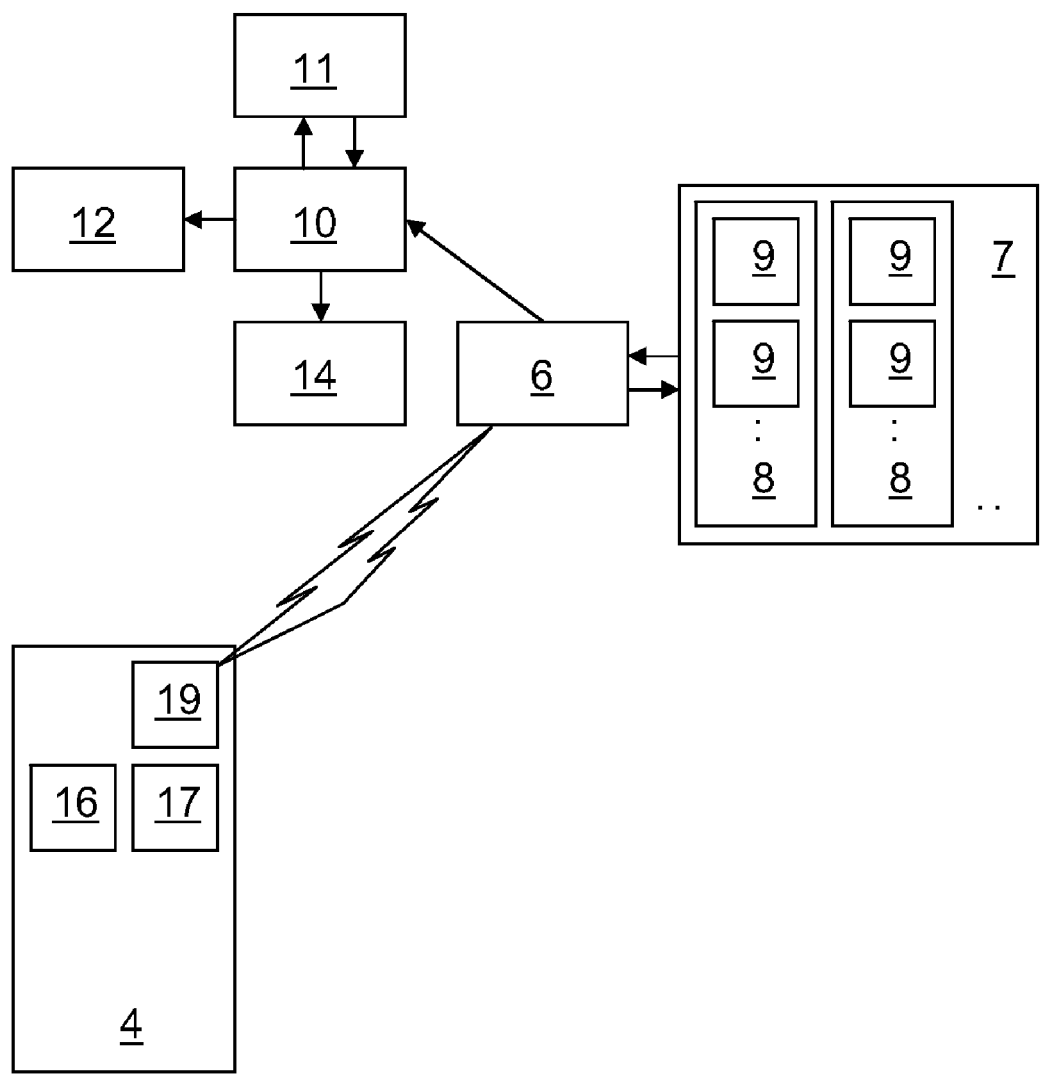
FIG. 4 shows schematically a system for the automatic determination of an emission value for a motor vehicle according to a fourth preferred embodiment of the invention.

According to the fourth preferred embodiment of the invention shown in FIG. 4, the storage device 17 transmits the fuel consumption data directly to the determination device 6. Here, too, a consumption sensor 16 that determines the fuel consumption is provided in the vehicle 4, and is also located in the tank. The fuel consumption data determined in this manner is transmitted to the determination device 6 in a different manner than described above in connection with the third preferred embodiment. The fuel consumption data is first stored in a storage device 17 provided in the vehicle 4. In this case, the storage device is connected with a transmission device 19 that makes it possible to transmit information regarding the fuel consumption wirelessly to the determination device 6, where this information is then used to determine the emission fee.

What is claimed is:

1. Process for the automatic determination of an emission value of a motor vehicle, with the following steps:
    Providing a fuel sensor, an identification device for registering an account identification, and an data storage device containing an account database itself containing at least one account information item for each of a multitude of accounts,
    Determination of a quantity of fuel that has been put into a tank and/or has been consumed by the motor vehicle by means of the fuel sensor,
    Determination of an account identification by means of the identification device,
    Association of the determined account identification with the determined quantity of fuel,
    Determination of at least one account information of an account associated with the account identification from the account database in the data storage device, wherein the account information at least comprises an account-specific emission key, whereby an emission quantity per the quantity of fuel determined is stored for the account,
    Determination of an emission value on the basis of the determined quantity of fuel and at least the determined account information of the account associated with the account identification.

2. Process according to claim 1 where the determined emission value includes an emission quantity and/or an emission fee.

3. Process according to claim 1 where the determined emission fee is automatically debited to a money account, preferably in conjunction with a payment for the quantity of fuel.

4. Process according to claim 1 where the account information comprises an account-specific emission quantity key and/or an account-specific compensation key and/or an account-specific type of compensation.

5. Process according to claim 1 where the type of fuel is determined and taken into account during the determination of the emission value.

6. Process according to claim 1 where a fuel consumption value is determined in the motor vehicle and is taken into account during the determination of the emission value.

7. System for the automatic determination of an emission value for a motor vehicle having a fuel tank, comprising:
    a fuel quantity sensor,
    an identification device for registering an account identification,
    a data storage device having stored therein an account database containing at least one account information item for each of a multitude of accounts, and
    a data processing system, including a determination device where:
    the determination device is adapted to take a fuel quantity value that is representative of the fuel quantity that was added to the tank and/or consumed by the vehicle as determined by the fuel quantity sensor and, an account identification registered by the identification device, and associating the determined fuel quantity value with the account identification, and
    determining an emission value on the basis of the determined fuel quantity value, and the at least one account information item of the account associated with the account identification, and
    wherein the account information at least comprises an account-specific emission key, whereby an emission quantity per the quantity of fuel determined is stored for the account.

8. System according to claim 7, where the determined emission value includes an emission quantity and/or an emission fee.

9. System according to claim 8, wherein the data processing system is further adapted to the determine an emission fee from the emission value and automatically debited the emission fee to a money account, preferably in conjunction with a payment for the fuel quantity.

10. System according to claim 8 where a fuel type sensor for distinguishing fuel types is provided that determines the type of the fuel and transmits it to the determination device.

11. System according to claim 8 where the account identification is provided on an identification element, preferably on a machine-readable magnetic card or on a RFID chip.

12. System according to claim 11, where, besides the account identification, the identification element includes at least one account information item.

13. System according to claim 8 where a consumption sensor is provided in the vehicle the consumption sensor being adapted to determine a fuel consumption value and transmitting the determined fuel consumption data to the determination device, and
    wherein the determination device is further adapted to take into account the fuel consumption value when determining the emission value.

14. System according to claim 13, further comprising a consumption data storage device disposed in the motor vehicle.

15. System according to claim 13 further comprising a wireless data transmission device disposed in the vehicle and adapted to transmit the fuel consumption data wirelessly to the determination device.

* * * * *